(12) United States Patent
Nonaka

(10) Patent No.: US 6,744,982 B2
(45) Date of Patent: Jun. 1, 2004

(54) DISTANCE-MEASURING DEVICE OF CAMERA AND FOCUSING METHOD OF CAMERA

(75) Inventor: Osamu Nonaka, Sagamihara (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 10/272,967

(22) Filed: Oct. 17, 2002

(65) Prior Publication Data
US 2003/0099471 A1 May 29, 2003

(30) Foreign Application Priority Data
Oct. 18, 2001 (JP) ....................................... 2001-321000

(51) Int. Cl.⁷ ................................................. G03B 3/10
(52) U.S. Cl. ........................................ 396/121; 396/123
(58) Field of Search ........................ 396/89, 106, 120, 396/121, 122, 123

(56) References Cited

U.S. PATENT DOCUMENTS

| | | | |
|---|---|---|---|
| 4,637,705 A | | 1/1987 | Kawabata |
| 5,715,483 A | * | 2/1998 | Omata et al. .................. 396/80 |

\* cited by examiner

Primary Examiner—David Gray
Assistant Examiner—Arthur A Smith
(74) Attorney, Agent, or Firm—Straub & Pokotylo; John C. Pokotylo (57) ABSTRACT

A distance-measuring device has (1) a distance-measuring part that detects the distance to an object through distance measurements at multiple distance-measuring points in a picture and (2) an operating part that excludes distance-measuring points of a group composed of distance-measuring points adjacent to each other with distance-measured values in a predetermined range from focusing target or lowers a focusing precedence when a distance-measuring point adjacent to a boundary of the picture is included in the above group.

15 Claims, 9 Drawing Sheets

IMAGE PLANE

DISTANCE-MEASURING DEVICE OF CAMERA AND FOCUSING METHOD OF CAMERA

CROSS-REFERENCE TO RELATED APPLICATION

This application is based upon and claims the benefit of priority from the prior Japanese Patent Application No. 2001-321000, filed Oct. 18, 2001. The entire contents of that application are incorporated herein by reference.

BACKGROUND OF THE INVENTION

1. Field of the Invention

The present invention relates to a distance-measuring technique for a camera, and particularly to a distance-measuring device performing a distance measurement in plural regions in a picture.

2. Description of the Related Art

Conventional auto-focus techniques for a camera are known. Many of the auto-focus techniques focus on an object at the center of a picture (i.e., a bounded image). Therefore, when an object is not in the center area of a picture, the camera is moved so that the object is brought temporarily to the center of the picture and focused upon. Then, after the focusing position is locked, the camera is moved back so that the original composition of the picture is recovered. However, this technique may be too slow for certain situations and require too much skill for a casual user.

U.S. Pat. No. 4,637,705 discloses a technique in which correct, or at least improved, focusing is accomplished regardless of the position of an object in a scene, even where there is no object at the center of the picture. More specifically, this technique uses multiple distance-measuring points in the picture (multi AF).

In many photographs, however, a principal object exists at the center of a picture. Therefore, as more points in an image are measured for purposes of auto-focus, the probability of taking a picture with the wrong focus position increases. Concerning this point, the prior patent ignores results that deviate from a predetermined distance range.

However, in the prior patent, the focus position is judged solely by distance-measuring results. Therefore it is difficult to determine whether the focus should be adjusted on the center of the picture, or on an area at the periphery of the picture. If the center of the picture is focused on, and the principal object (e.g., a person) is in an area at the periphery of the picture, the principal object will not be in focus. On the other hand, if the periphery of a picture is focused on and the principal object (e.g., a person) is in the center of the picture, the principal object will not be in focus.

In view of the foregoing limitations of the prior autofocusing technique, a distance-measuring device for a camera having a high possibility of enabling a correct focusing, regardless of an object's position in a picture, is needed.

BRIEF SUMMARY OF THE INVENTION

In the present invention, a distance-measuring device of a camera judges, in the selection of a principal object, whether an object is fully included in a picture. If it is not fully included, it is determined not to be the principal object. If an object is judged not to be the principal object, the object is excluded from focusing targets or a focusing precedence of the object is reduced.

In more detail, the distance-measuring device of a camera usually contains the following: a distance-measuring part that detects the distance to an object or objects at multiple distance-measuring points in a picture; and an operation part that excludes a distance-measuring point as a focusing target or lowers a focusing precedence of the object when the distance-measuring point is a member of a group composed of distance-measuring points adjacent to each other within a predetermined distance range, and one of members of the group is adjacent to the boundary of the picture.

The above group preferably contains a distance-measuring point with the shortest object distance.

The above group preferably contains multiple distance-measuring points joined in a direction from a distance-measuring point at the periphery of picture to a boundary of picture.

The above group preferably does not contain a distance-measuring point in the central part of picture.

The determination of the above group preferably includes the following process: (1) selecting a distance-measuring point with the shortest object distance. (2) selecting adjacent distance-measuring points in a direction from the selected distance-measuring point to the boundary of the picture when the above selected distance-measuring point is at the periphery of the picture.

The above distance-measuring part preferably has a common distance-measuring region, and an expanded distance-measuring region on a side or sides of the boundary of the picture with respect to the above common distance-measuring region. The above group is formed when the distance-measuring point with the shortest object distance in the common distance-measuring region is located at the periphery of the common distance-measuring region. The above group contains the distance-measuring point with the shortest distance in the common distance-measuring region and multiple distance-measuring points in the expanded distance-measuring region joined to the distance-measuring point with the shortest distance.

For example, in the distance-measuring device of the present invention, the distance to an object or objects may be measured in multiple regions (points) on a picture, and the region with the shortest distance to the object is detected and taken as a principal object candidate. In this case, if the principal object candidate is at the periphery of the picture, the object may likely protrude from (i.e., extend beyond the bounds of) the picture. Accordingly, the distance-measuring device examines whether a region having a similar object distance to the above principal object candidate (a region having continuity) continues from the principal object candidate to the boundary of the picture and, if it continues, judges that the principal object candidate protrudes from the picture (the principal object candidate is not fully included in the picture).

The above distance measurement can be obtained, e.g., by trigonometry. Alternatively, or in addition, distance measurement may be performed by receiving a light given by emitting a stroboscopic light towards an object, and then measuring the quantity of reflected light.

BRIEF DESCRIPTION OF THE SEVERAL VIEWS OF THE DRAWING

These and other features, aspects and advantages of the apparatus and methods of the present invention will become better understood with regard to the following description, appended claims and accompanying drawings where:

DETAILED DESCRIPTION OF THE INVENTION

Preferred embodiments of the present invention will be described hereinafter with reference to the drawings.

First, Embodiment 1 of the present invention will be described.

Figure 1:
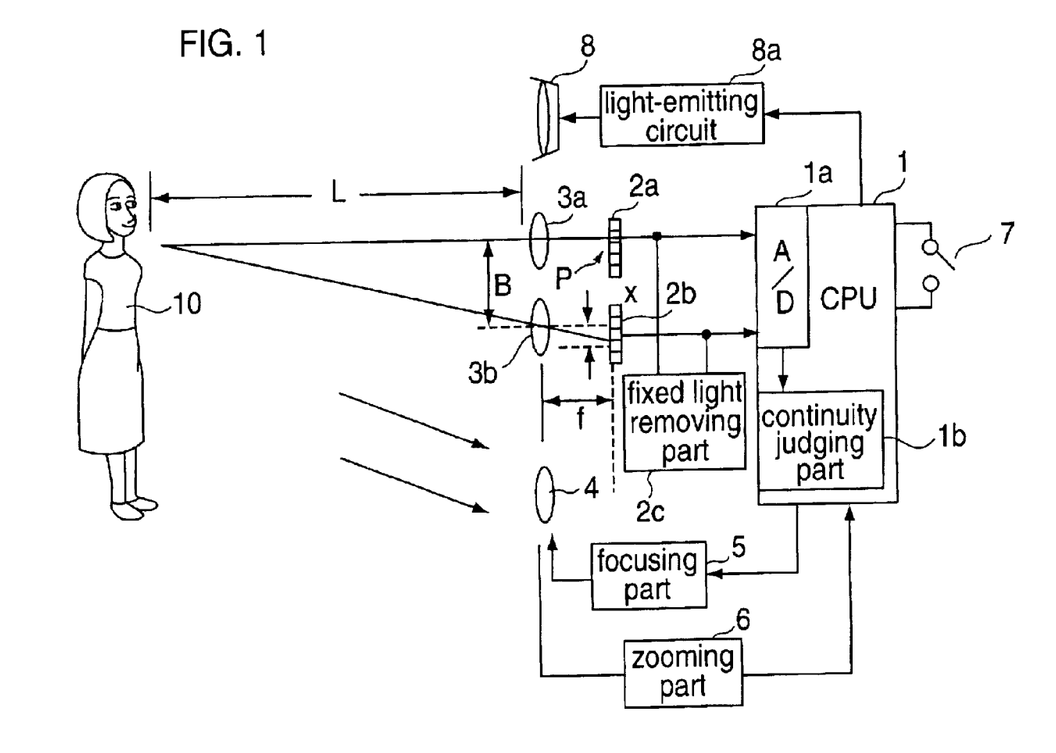
FIG. 1 is a block diagram of parts of a camera containing a distance-measuring device that is consistent with the principles of the present invention.

FIG. 1 is a block diagram of parts of a camera containing a distance-measuring device that is consistent with the principles of the present invention.

The light receiving planes of the sensor arrays 2a and 2b are arranged at the focal planes of two light-receiving lenses 3a and 3b for receiving light from an object 10. The sensor arrays 2a and 2b are connected to a CPU 1. A fixed light (environmental or ambient light) removing part 2c is further connected to the outputs of the sensor arrays 2a and 2b, as well as to the CPU 1. A (stroboscopic) light-emitting part 8 is connected via a (stroboscopic) light-emitting circuit 8a to the CPU 1 and a focusing part 5 and a zoom control part 6 for controlling a photographic lens 4 are further connected to the CPU 1. A switch 7 for releasing the shutter of the camera is also connected to the CPU 1. An A/D converter 1a and a continuity judging part 1b may exist inside the CPU 1. The continuity judging part 1b will be described in detail later.

In Embodiment 1, an exemplary distance-measuring device comprises the light-receiving lenses 3a and 3b, the sensor arrays 2a and 2b and the CPU 1. An exemplary distance-measuring part comprises the above light-receiving lenses 3a and 3b and the sensor arrays 2a and 2b. An operation part comprises the CPU1. In Embodiment 1, the CPU of the distance-measuring device is shared with the main CPU 1 which may be a one-chip microcomputer governing the operations of the camera, etc. However, a CPU or circuit exclusively used for the distance-measuring device may also be provided.

As shown in FIG. 1, the light from the object 10 is received by the sensor arrays 2a and 2b via the two light-receiving lenses 3a and 3b. The sensor arrays 2a and 2b generate electric signals corresponding to the intensity of the received light, and these signals are input into the CPU 1. The CPU 1 converts the analog signals from the sensor arrays 2a and 2b to digital signals by the built-in A/D converter 1a, compares the outputs of two sensor arrays and detects a position difference X of the object image.

Next, the CPU 1 computes a distance L to the object 10 from the above detected position difference X of the object image by a principle of trigonometric distance measurement. Here, if the distance between the two light-receiving lenses 3a and 3b (length of baseline) is denoted as B and the focal distance of the light-receiving lenses is denoted as f, the distance L to the object 10 may be determined by the following equation.

$$L = (B \cdot f)/X$$

The CPU 1 drives a focusing part 5 to control the position of the photographic lens 4 according to the distance L to the object 10 as determined above. For example, the focusing part 5 may include a focusing motor (not shown) driven by driving control signal (e.g., a pulse train) generated by the CPU 1, and a focusing lens barrel (not shown) which advances or recedes through movement of gears generated by the rotation of this focusing motor.

Moreover, the photographic lens 4 is a zoom lens in many cases. If the photographic lens 4 is a zoom lens, the photographic field angle and focal depth vary with the zoom position. The CPU 1 sends a signal to a zoom control part 6 and changes the focal distance of the photographic lens 4 according to an operator's indication. For example, the zoom control part 6 may include a zoom motor (not shown) driven by a driving control signal (e.g., a pulse train) generated by the CPU 1 and a zoom lens barrel (not shown) which advances or recedes through movement of gears generated by the rotation of this zoom motor.

The CPU 1 further controls the (stroboscopic) light-emitting circuit 8a and allows the (stroboscopic) light-emitting part 8 to emit a light according to the brightness of object. Thus, photography of a dark scene is enabled by the (stroboscopic) light which compensates for the lack of light during exposure. Moreover, image data may also be emphasized by allowing the (stroboscopic) light-emitting part 8 to emit a light during the distance measurement.

The fixed light removing part 2c is connected to the two sensor arrays 2a and 2b. For example, the fixed light removing part 2c may include a memory for temporarily storing the outputs of the sensor arrays and a parallel analog subtracter. The fixed light removing part 2c computes a difference between an output of the sensor arrays when the (stroboscopic) light-emitting part 8 emits a light (an output given by the fixed light and the emitted (stroboscopic) light) and an output of sensor arrays when the (stroboscopic) light-emitting part 8 does not emit a light (an output given by the fixed light only) and outputs the difference. If the CPU 1 operates the fixed light removing part 2c, a signal given by the fixed light (environmental or ambient light) is removed and only a reflected light component in the projection of the emitted (stroboscopic) light is output. This output is digitized by the A/D converter 1a of CPU 1.

The appearance of distance measurement in the visual field 11 of a finder is described with reference to FIG. 2. The finder visual field 11 is wider than the actual image pickup range of the camera. A monitor range 12 of the sensor array 2a is provided in the finder visual field 11, and this monitor range 12 is divided into multiple regions in the horizontal direction. Distance measurement is possible in each of these regions. Namely, there are multiple distance-measuring points in the finder visual field. The operator of the camera can see the monitor range 12 in the finder visual field, but the visibility of the monitor range 12 is not essential.

Figure 2:
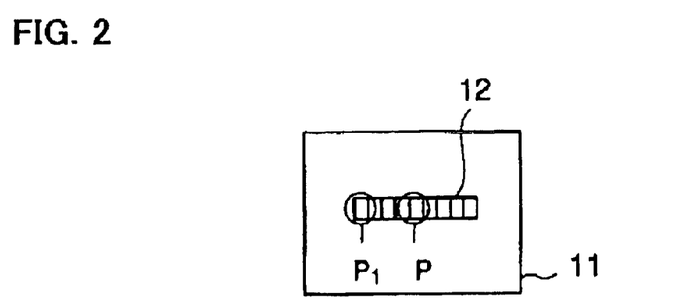
FIG. 2 is a diagram showing the visual field of a finder that may be provided in the camera of FIG. 1.

The position of P of FIG. 2 is near the center of the finder visual field 11, and the distance measurement of an object in the position of P can be made in a region of the monitor range 12 corresponding to this position of P. The position of P1 is near the periphery of the finder visual field, and the distance measurement of an object in the position of P1 can be made in a region of the monitor range 12 corresponding to this position of P1.

Figure 3:
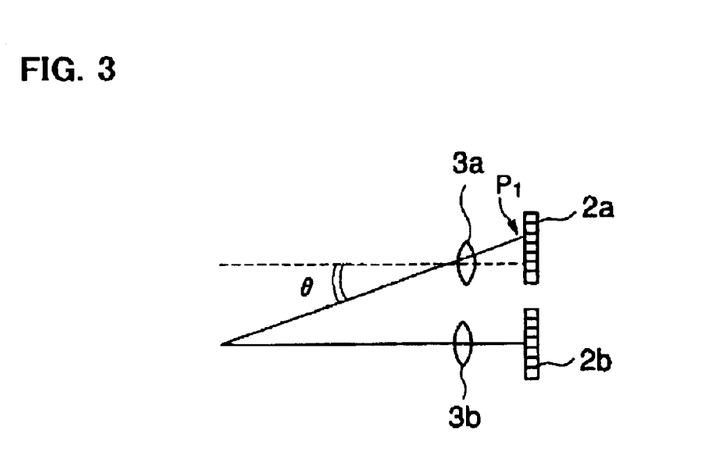
FIG. 3 is a diagram showing a relationship between the angle made by a ray incident onto a sensor array, consistent with the principles of the present invention, with the optical axis and the incidence position of the ray on the sensor arrays.

FIG. 3 is a diagram showing a relationship between the angle made by a ray incident into the sensor array 2a with the optical axis and the incidence position of the ray on the sensor array 2a. The ray incident at an angle θ with the optical axis is incident on position of P1 on the sensor array 2a. Thus, the range of the object measurable by the sensor array 2a (a range of angle made with the optical axis) is decided by the measurement range of the sensor array 2a. Namely, if the measurement range of the sensor array 2a is lengthened, the distance to the object can be measured over a wider field angle range. If the measurement range of the sensor array 2a is shortened, the distance to the object can be measured only over a narrower field angle range. Usually, the length of the sensor array defines the measurement range of the sensor array, but in this embodiment, portions near both ends of the sensor array are reserved as expanded portions.

Figure 5:
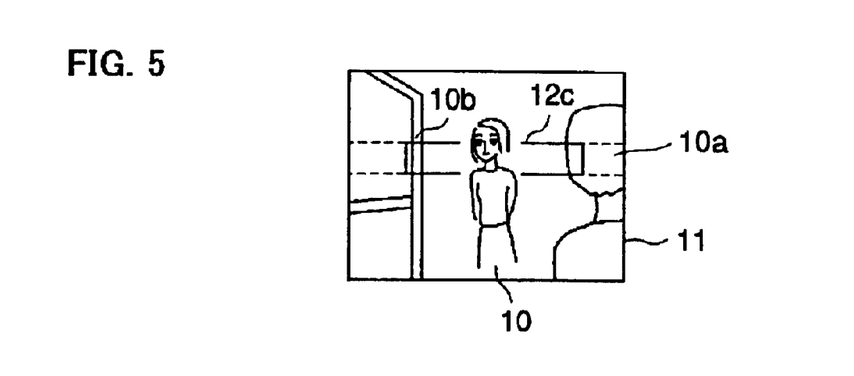
FIG. 5 is a diagram showing a relationship between an object and a background in a finder for illustrating principles of the present invention.

FIG. 5 is a diagram showing a case where a person being the principal object 10 is at the center of the finder visual field 11. In addition to the principal object 10, miscellaneous objects 10a and 10b are also included in this finder visual field 11. In this case, the distances of the miscellaneous objects 10a and 10b are also measurable, as is the principal object 10, in a monitor range 12c (shown by solid lines) which is the measurable range of the sensor arrays. Moreover, distances of even wider portions of the miscellaneous objects become measurable if monitor ranges 12R and 12L (shown by broken lines) are added to the width of the monitor range 12c.

Figure 6:
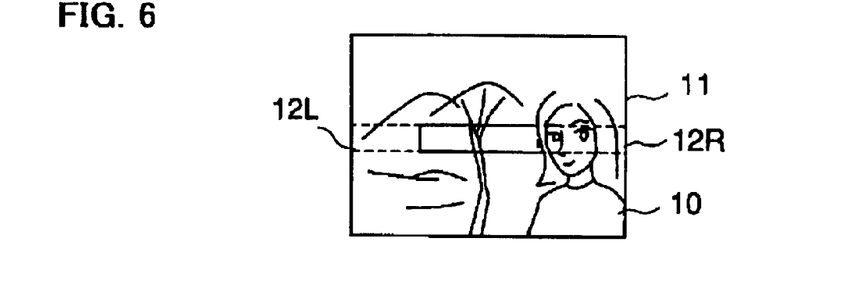
FIG. 6 is a diagram showing a relationship between an object and a background in a finder for illustrating principles of the present invention.
Figure 7:
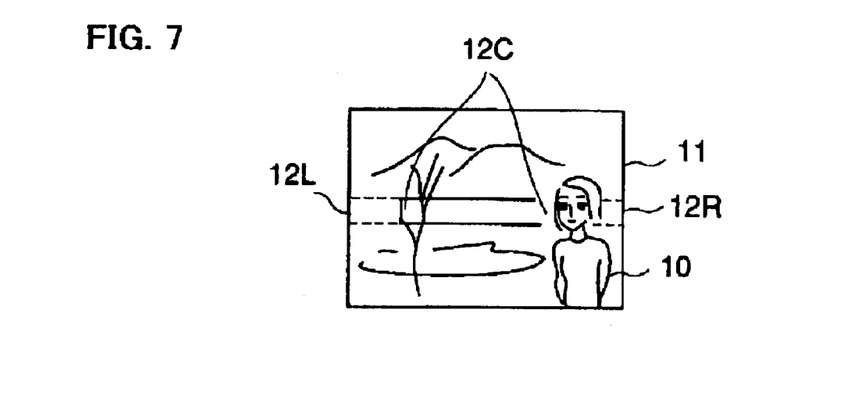
FIG. 7 is a diagram showing a relationship between an object and a background in a finder for illustrating principles of the present invention.

FIGS. 6 and 7 are diagrams showing cases where a person being the principal object 10 is not at the center, but at the periphery, of the finder visual field 11. Distance of only a small portion of the principal object 10 is measurable in the monitor range 12c. In this case, if the monitor ranges 12R and 12L (shown by broken lines) are added to the width of the monitor range 12c, and distance of a wider range of the principal object 10 becomes measurable.

Thus, if a sufficient length of the sensor arrays is taken to secure a wide monitor range, an auto-focus camera capable of focusing a principal object (e.g., a person), regardless of the position of the object, can be provided. Of course, for example, if the fixed light removing circuit 2c is operated and the (stroboscopic) light emitting parts 8 and 8a are operated to emit a (stroboscopic) light, the distances can be correctly measured by an image of light reflected from the principal object. Such an operation is useful when a reflected light image of the principal object cannot be correctly obtained because of a back light condition, etc.

However, in a scene like FIG. 5, even if the principal object 10 comes into the center of the finder visual field 11, the miscellaneous objects 10a and 10b come into the monitor range for the distance measurement. In such a case, focusing is sometimes made, mistakenly, based on distances to the miscellaneous objects 10a or 10b rather than to, or in addition to, the principal object 10. Moreover, as illustrated in FIG. 6 and FIG. 7, focusing could be made, based on distances to other objects when the principal object 10 is at the periphery of the finder visual field 11.

In this first embodiment, the continuity judging function 1b is provided in the CPU 1 to deal with these problems. The continuity judging function is based on an assumption that, in a usual or typical compositional characteristic, the whole principal object 10 (or its main part) will come into a picture even when the principal object 10 is at the periphery of the picture, and that miscellaneous objects frequently protrude from (i.e., extend beyond the bounds of) the picture when the miscellaneous objects are at the periphery of the picture. In the example of FIG. 5, the miscellaneous object 10a (a person) and 10b (a door) are at the periphery of the picture but protrude from (i.e., extend beyond the bounds of) the picture. On the other hand, in the each of the examples of FIGS. 6 and 7, the entire head of the principal object 10 comes into (is within the bounds of) the picture when the principal object 10 is at the periphery of the picture. The continuity determining function 1b examines whether the object portion continues to the very boundary of the picture when a principal object candidate exists at the periphery of the picture, judges this principle object candidate to be a miscellaneous object if it continues to the boundary, and judges this principle object candidate to be a principal object if it does not continue to the boundary.

The continuity judging function 1b is described in detail hereafter, with reference to the drawings.

Figure 8:
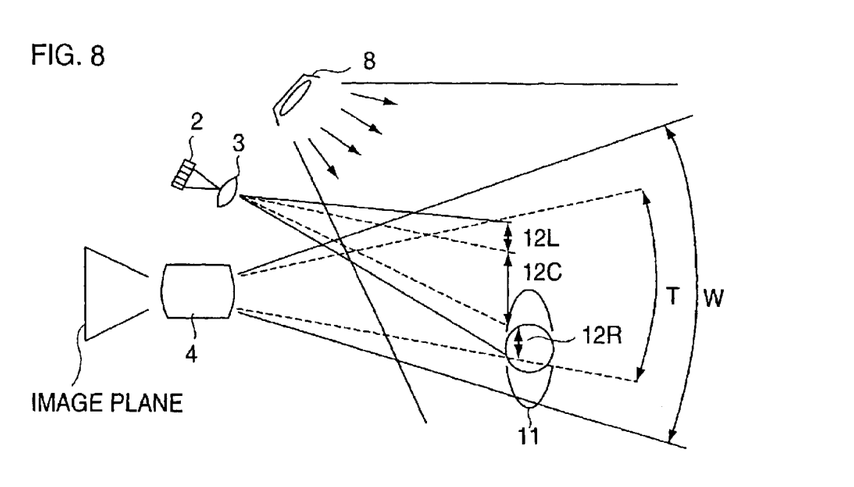
FIG. 8 is a diagram showing the change in appearance of a picture with a candidate object at its periphery, provided from a photographic zoom lens as the zoom lens changes between T (telescopic) and W (wide) during telescopic and wide-angle observations.

FIG. 8 illustrates how the image of the photographic lens 4 changes during telescopic and wide-angle observations when the image pickup lens 4 is a zoom lens. The photographic range of the photographic lens 4 is shown by an angle T during the telescopic observation and by an angle W during the wide-angle observation. As shown in FIG. 1, the sensor arrays 2 and the light receiving lenses 3 are included in the distance-measuring device and the (stroboscopic) light-emitting part 8 irradiates the object 10. The monitor range of this distance-measuring device (comprising the light-receiving lenses 3 and the sensor arrays 2) becomes switchable by making the range of 12c measurable and also making 12L, 12R measurable to get an even wider range so that a predetermined wide range can be covered in either the T (telescopic side) or W (wide side).

Figure 9:
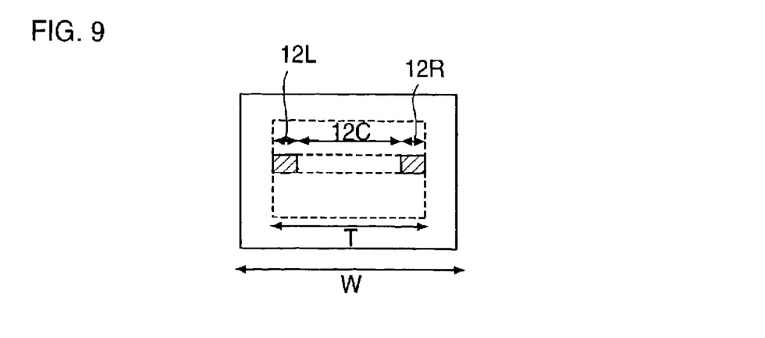
FIG. 9 is a diagram showing the change in view of a finder when a picture provided from a photographic zoom lens as the zoom lens changes between T (telescopic) and W (wide) during telescopic and wide-angle observations.

FIG. 9 shows the appearance of switching this distance-measuring range in the finder visual field 11. W is the pickup picture width when the photographic lens 4 is wide-angle and T is the pickup picture width when the photographic lens 4 is telescopic. Expanded monitor ranges 12L, 12R are provided on both sides of a common monitor range 12c. Thus, the common monitor range 12c and the expanded monitor ranges 12L, 12R are included in the photographic range even when the photographic lens 4 becomes telescopic and the field angle of the pickup picture is minimized.

For example, the switching of the distance-measuring range can be realized when the length of the sensor arrays is long enough to provide the common monitor range 12c and the expanded monitor ranges 12L, 12R. Only the range of the sensor arrays corresponding to the monitor range 12c is usually and commonly used. The range of the sensor arrays corresponding to the expanded monitor ranges 12L, 12R are supplemented and used according to demand.

For example, like FIG. 7 in which the principal object 10 is at the periphery of the picture in a telescopic observation, the object is detected at the position adjacent to the boundary of the distance-measuring range (the right end of the distance-measuring range in FIG. 7) if only the common monitor range 12c is used. In such a case, the distance-measuring range is switched to add the expanded monitor ranges 12L and 12R, and it is judged whether the object detected at the end of the common monitor range 12c is also detected in one of the expanded monitor ranges 12L or 12R as in spatially continued manner (has a continuity). Then, if the object has continuity, (i.e., if it extends to the edge of the range of 12R) it is judged to be a miscellaneous object and excluded (invalidated) as a focusing target and focusing is performed based on other points. If the object has no continuity, (i.e., if it does not extend to the edge of the range 12R) it is judged to be a candidate principal object.

Figure 10:
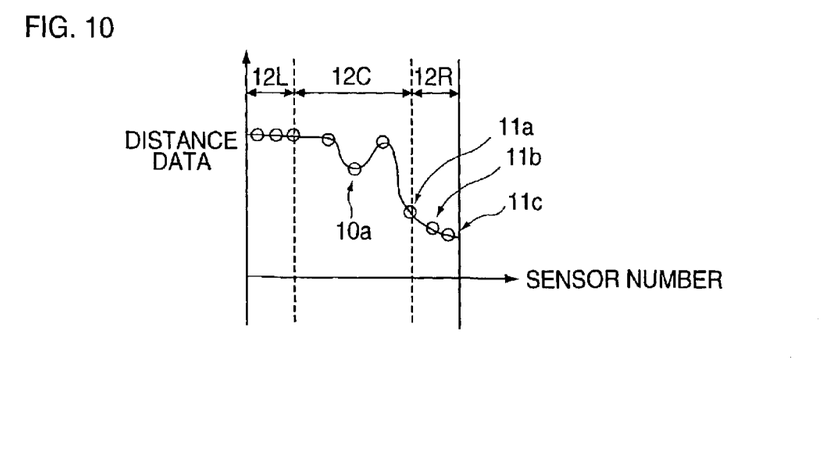
FIG. 10 is a diagram showing the distribution of distance data across a number of sensors, where the sensors are arranged in a manner consistent with the principles of the present invention.

FIG. 10 is a diagram for illustrating the above continuity judgment. The horizontal axis of FIG. 10 is the sensor number of a sensor in the sensor arrays used for the distance measurement. The vertical axis shows the measured distance value in each distance-measuring position. The common monitor range 12c is located at the central part of the horizontal axis, and the expanded monitor ranges 12L, 12R are located at both of its ends.

According to FIG. 10, a near-point 10a exists at the center of distance-measuring range, and it becomes one of principal object candidates. A near-point 11a nearer than 10a also exists at the right end of the common monitor range 12c, and it becomes another principal object candidate. At this time, the distance-measuring range is switched to add the expanded monitor ranges 12L, 12R to the common monitor range 12c. If the measured distance values of 11b, 11c in the expanded monitor range are within a predetermined range relative to the measured distance value of 11a, they are considered to be parts of the same object and judged to have the continuity. In the example of FIG. 10, a group comprising the distance-measuring points 11a, 11b, 11c has continuity and includes the distance-measuring point 11c adjacent to the boundary. Therefore, there is a high possibility that the object protrudes from (i.e., extends beyond the bounds of) the picture. Accordingly, the distance measuring result of point 11a is invalidated (for purposes of auto-focus) and the distance measuring result of point 10a at the center of picture is adopted (for purposes of auto-focus).

Figure 4:
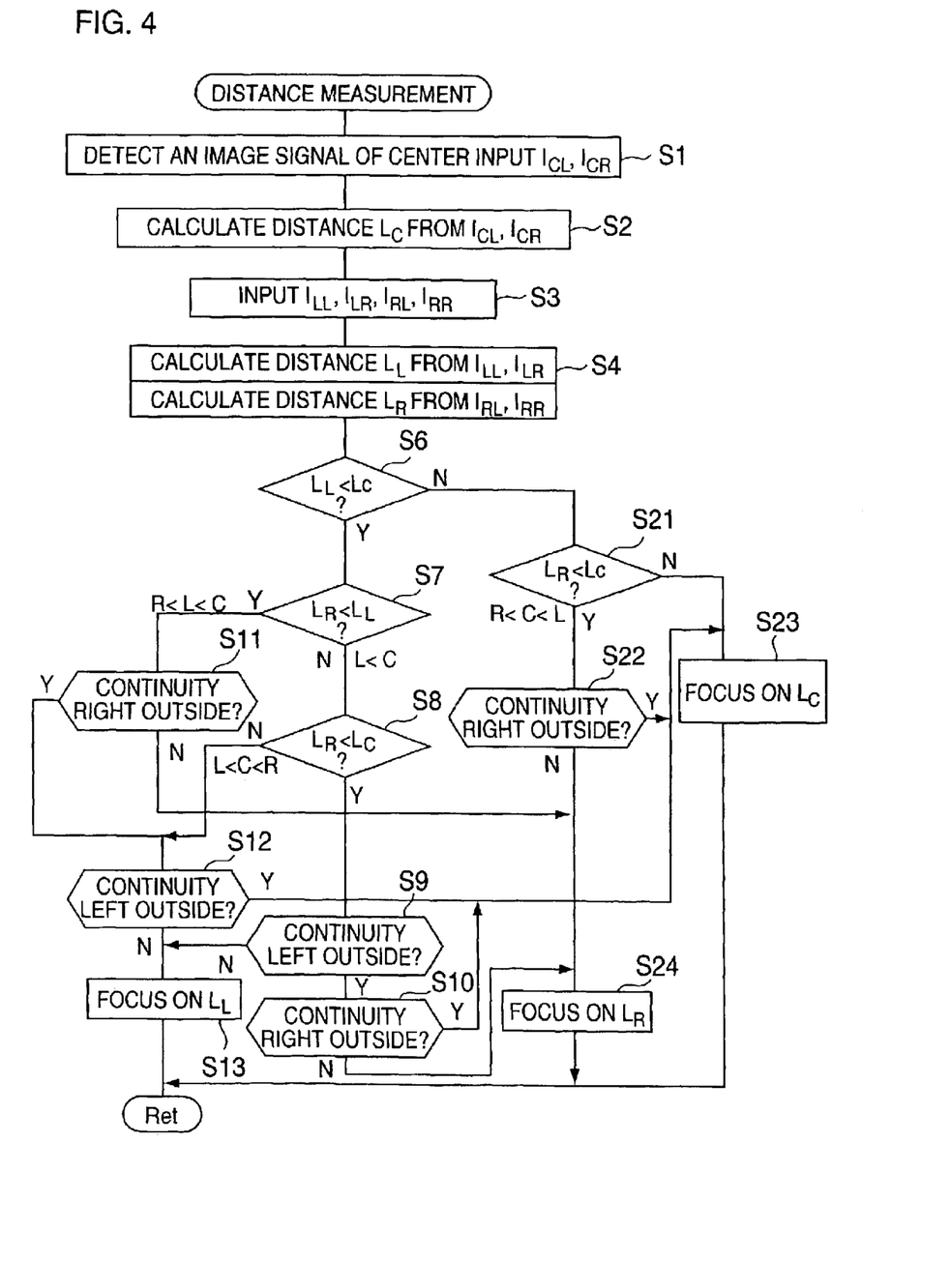
FIG. 4 is a flow chart of an exemplary method for selecting a principal object while judging continuity in a manner consistent with the principles of the present invention.

A flow diagram of an exemplary method for judging continuity to detect the principal object, or to eliminate a candidate principle object, is shown in FIG. 4. The distance-measuring positions are only taken as three points at the center, left and right of a picture to simplify the illustration in FIG. 4. Although the focusing is made for the point with the minimum distance-measured value among the three points at the center, left and right of the picture in this flow, when the point with the minimum distance-measured value is at the left or right periphery of the picture, the point with the minimum distance-measured value is excluded from the focused target when a group composed of points having the continuity at that point includes a distance-measuring point adjacent to the boundary (i.e., is at the edge) of the picture.

First, in step S1 an image signal at the central part of a picture is detected. For example, two image data ICL, ICR are input from the pair of sensor arrays. In step S2, a deviation state of the image position (X of FIG. 1) is detected from these data (e.g., ICL, ICR) to calculate a distance LC. Similarly, in step S3, data from the edges of (e.g., two image data ILL, ILR from) the picture left and data from the edges of (e.g., two image data IRL, IRR from) the picture right are further input from the pair of sensor arrays. In step S4, a distance LL to an object of the picture left is calculated from data (e.g., the two image data ILL, ILR) of the picture left, and a distance LR to an object of the picture right is calculated from the data (e.g., two image data IRL, IRR) of the picture right.

Afterward, the resultant distances are examined and compared at S6 and thereafter. In step S6, the CPU 1 judges whether the distance LC to the object of the picture center is longer than the distance LL to the object of the picture left, and executes step S21 if the judgment result is NO (LC$\leq$LL). In the step S21, the CPU 1 judges whether the distance LC to the object of the picture center is longer than the distance LR to the object of the picture right. If the judgment result is NO (LC$\leq$LL and LC$\leq$LR), the distance LC to the object of the picture center is the smallest. Therefore a principal object is determined to exist at the picture center. Thus, the CPU 1 executes step S23 to make focusing based on LC and then returns.

On the other hand, if the judgment result is YES (LR<LC$\leq$LL) and the picture right is the nearest in step S21, the CPU 1 executes step S22. In step S22, the CPU 1 judges whether continuity exists on the outer side in the picture right. If the CPU 1 judges that no continuity exists, the principle object is determined to exist at the right of the image. Accordingly, CPU 1 executes step S24 to focus on the picture right (LR) and returns. If the CPU 1 judges that the continuity exists, the right object is determined to be a miscellaneous object. Thus, the CPU 1 executes the step 23 to focus on the picture center (LC) because the picture center is the second nearest, and returns.

Returning it to the step S6, if the judgment result is YES (LL<LC) in the step S6, the CPU 1 executes step S7. In the step S7, the CPU 1 judges whether the distance LL to the object of the picture left is longer than the distance LR to the object of the picture right. If the judgment result is YES (LR<LL<LC), the picture right is the nearest, therefore the CPU 1 judges whether the continuity exists on the outer side at the picture right in the step S11. If the CPU 1 judges that no continuity exists, the principle object is determined to exist at the right of the image. Thus, CPU 1 executes the step S24 to focus on the picture right (LR) and returns. If the CPU 1 judges that the continuity exists in step S11, the right object is determined to be a miscellaneous object. Because the picture left is the second nearest, the CPU 1 executes step 12. The CPU1 judges in step S12 whether the continuity exists on the outer side at the picture left. If the CPU 1 judges that no continuity exists, the left object is determined to be a principle object. Thus, the CPU executes step S13 to focus on LL and returns. If the CPU 1 judges that continuity exists in the step S12, the left object is determined to be a miscellaneous object. Thus, the CPU executes the step S23 to focus on the third nearest object at LC and returns.

Returning it to the step S7, if the judgment result is NO in the step S7, the CPU 1 executes step 8 and judges whether the distance LC to the object of the picture center is longer than the distance LR to the object of the picture right. If the judgment result is NO (LL<LC≦LR), the picture left is the nearest. Therefore the CPU 1 executes the step 12. If the CPU 1 judges that continuity exists in the step S12, it is determined that the left object is a miscellaneous object. Thus, the CPU 1 focuses on the picture center (LC) in the step S23. If the CPU 1 judges that no continuity exists, it is determined that the left object is the principle object. Thus, the CPU 1 focuses on the picture left (LL) in the step S13 and returns.

Returning to step S8, if the judgment result is YES (LL≦LR<LC) in the step S8, the picture left is the nearest, and the CPU 1 executes step S9. In the step S9, the CPU 1 judges whether continuity exists at the picture left. If the CPU 1 judges that no continuity exists, it is determined that the left object is the principle object. Thus, the CPU 1 focuses on the picture left (LL) is step S13 and returns. If the CPU 1 judges that continuity exists, it is determined that the left object is a miscellaneous object. Thus, the CPU 1 executes step S10 and judges whether the continuity exists on the outer side of the picture right. If continuity exists, it is determined that the right object is a miscellaneous object. Thus, the CPU 1 focuses on the picture center (LC) in the step S23 and returns. If, on the other hand, no continuity exists, it is determined that the right object is the principle object. Thus, the CPU 1 focuses on the picture right (LR) in the step S24 and returns.

Figure 12:
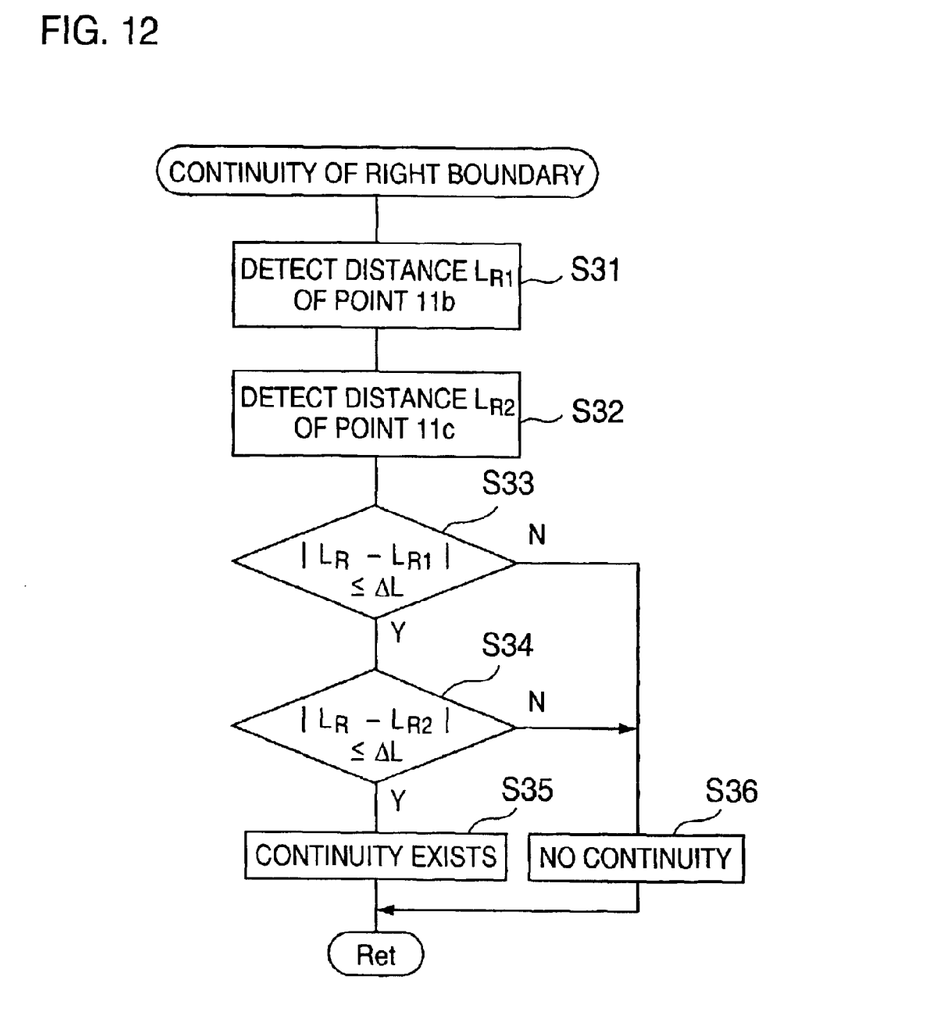
FIG. 12 is a flow chart of an exemplary method of judging continuity in a manner consistent with Embodiment 1 of the present invention.

FIG. 12 is a flow diagram of an exemplary method for judging continuity in FIG. 4. The case of the picture right is described in FIG. 12, but the continuity on the picture left side is similarly judged.

First, if the CPU 1 judges that the object of the picture right has the shortest distance, the CPU1 adds the expanded monitor ranges 12L, 12R to the common monitor range 12c (see FIG. 10) and executes the flow of FIG. 12. First, the CPU 1 measures the distances of points 11b, 11c further outside than the object position 11a of the picture right and gets the distance-measuring results LR1 and LR2 (steps S31 and S32). Here, 11c is a distance-measuring point adjacent to the boundary of picture. Next, the CPU 1 executes step S33 and judges whether a difference between the distance-measuring result LR of point 11a and the distance-measuring result LR1 of outer point 11b is less than a predetermined quantity. If the above difference is not less than a predetermined quantity, the CPU 1 judges that no continuity exists in step S36 and returns. If the above difference is less than a predetermined quantity, the CPU 1 then judges whether a difference between the distance-measuring result LR1 of outer point 11b and the distance-measuring result LR2 of outer point 11c is less than a predetermined quantity in step S34. If the above difference is not less than a predetermined quantity, the CPU 1 judges that no continuity exists in step S36 and returns. If the above difference is less than a predetermined quantity, the CPU 1 judges that the continuity exists in step S35 and returns.

Thus, if both differences between LR and LR1, LR1 and LR2 are less than a predetermined quantity, it is judged that an object exists near the outside of the picture, and has continuity. Since this continuity leads to the conclusion that the object is a miscellaneous object, LR should no longer be considered as a candidate principle object.

If the points are judged to have no continuity, the object does not continue to the outside of picture. It is considered to be a scene fully including the principal object in the picture like FIG. 7. Therefore, the object is considered a principal object (for purposes of focusing) in the present invention.

As described above, in Embodiment 1, when an object at the shortest distance exists at the periphery of a picture, it is judged whether the object continues to the edge (boundary) of and beyond the picture (a judgment of continuity). If it isn't, the focusing is made on the object with the shortest distance. Therefore, like FIG. 5, the central object can be focused even if closer miscellaneous objects exist at the left and right of picture. Like FIG. 7, the principal object can be correctly focused on even if the principal object exists at the periphery of picture (if the object is fully included in the picture).

Although the sensor array 2a or 2b was shown as a linear component, either or both can be replaced by a two dimensional sensor.

(Embodiment 2)

Next, Embodiment 2 of the present invention will be described. In Embodiment 2 of the present invention, a reflected light pattern produced during the stroboscopic light projection is judged to make an even high-speed continuity judgment. Only the portions different from Embodiment 1 will be described.

Figure 11:
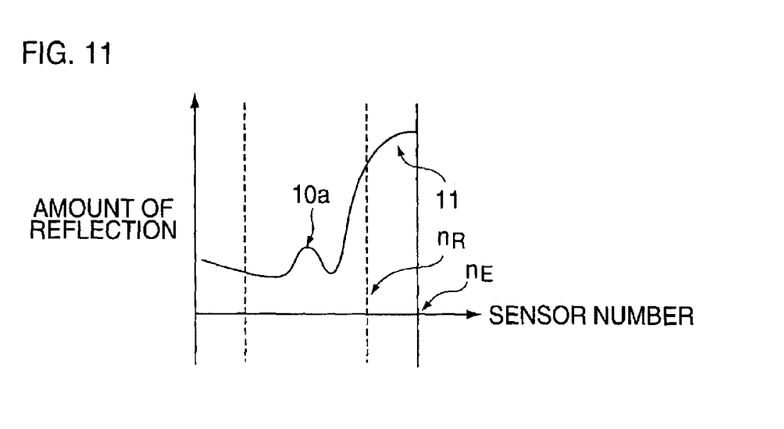
FIG. 11 is a diagram showing the distribution of reflection data across a number of sensors, where the sensors are arranged in a manner consistent with the principles of the present invention.

In Embodiment 2, the fixed light removing part 2c described in FIG. 1 is used. When a stroboscopic light is emitted, generally, a lot of reflected light returns from a short-distance object and a little reflected light returns from a far object. Therefore, the distance to an object can be judged to some extent by the intensity of the reflected light. For example, in a situation like that shown in FIG. 8, the distribution of reflected light quantity has a peak of a reflected light coming to a corner of the measurement range like that shown in FIG. 11. This indicates that an object is at a corner of the image pickup range. Accordingly, if the reflected light distribution like FIG. 11 is obtained, it is judged that a short-distance object exists at the right of the picture.

Whether this short-distance object is a principal object or a miscellaneous object is judged. In FIG. 11, the horizontal axis is taken as an axis where one by one image elements forming a sensor array for the distance measurement are called by numbers (sensor numbers). The utmost right sensor number in the common monitor range is denoted as nR and the sensor number of detection limit of the expanded monitor region is denoted as nE. The nE is a sensor adjacent to the boundary of picture. As shown in FIG. 8, if a person 11 stands so that he protrudes into the periphery of a picture, a large amount of reflected light returns from the nR sensor to the nE sensor. In this case, the object can be judged to extend beyond the edge (or boundary) of the picture. Therefore the object is judged to be a miscellaneous object. Accordingly, it is known that the distance-measuring result of point nR (point 11a in FIG. 10) should not be adopted. Instead, the point 10a at the central part has a higher probability of being a principal object (e.g., like the scene of FIG. 5).

Figure 13:
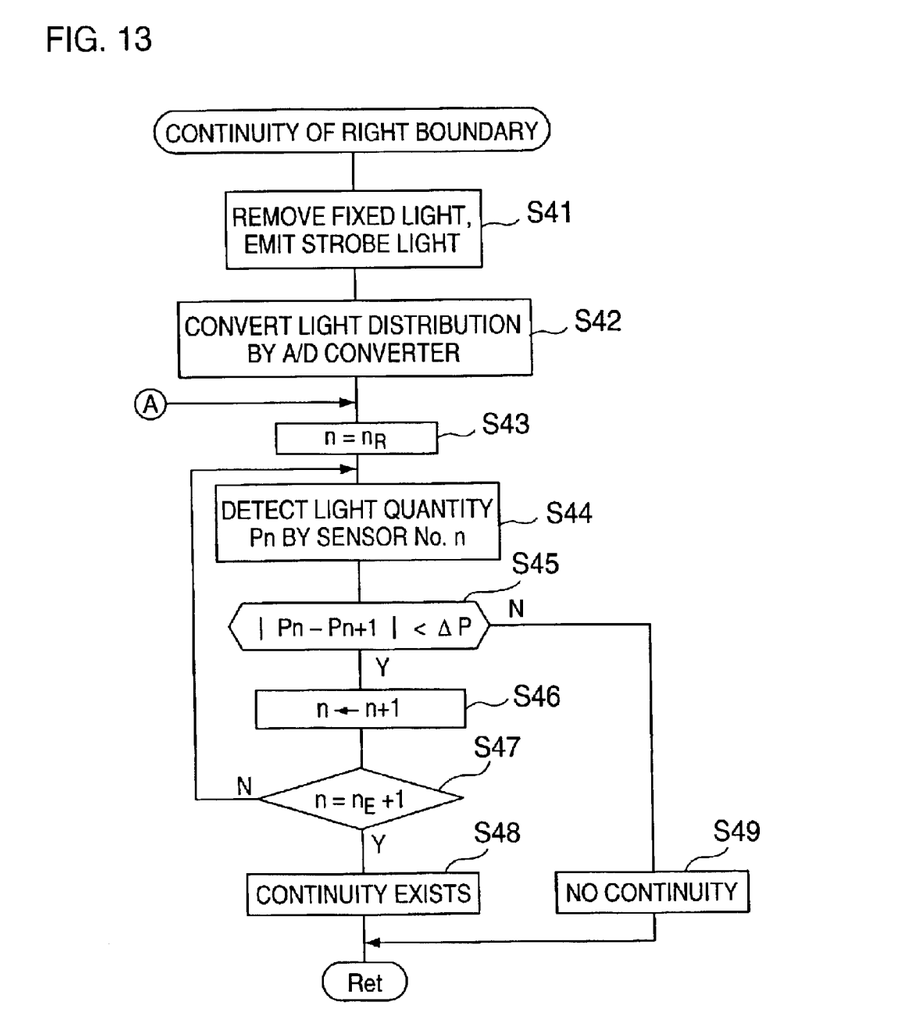
FIG. 13 is a flow chart of an exemplary method of judging continuity in a manner consistent with Embodiment 2 of the present invention.

A flow chart of FIG. 13 is used to judge such a state. In the flow chart of FIG. 13, the continuity judgment of the R (right) side only is described, but the L (left) side can also be judged similarly.

As shown in FIG. 13, the CPU 1 operates the fixed light removing part 2c and performs the (stroboscopic) light projection in step S41. Next, the CPU 1 A/D converts a reflected light quantity distribution (image signal) obtained at that time.

Afterward, the CPU 1 sets the above nR to an initial value of position n of a sensor array. Then, the CPU 1 detects a light quantity Pn in the position n of the above sensor array and a light quantity Pn+1 of sensor array on the outer side adjacent to the above position n. In step S45, the CPU 1 judges whether the difference of above Pn and Pn+1 is less than a predetermined quantity ΔP. If the judgment result is NO (not less than ΔP), the CPU 1 judges that no continuity exists in this object (step S49) and returns. If the judgment result is YES (less than ΔP), the CPU 1 adds one to the position n of sensor array in step S46. The CPU 1 judges whether the current step position exceeds the nE in step S47, and determines that continuity exists and returns if YES, or simply returns to step S44 if NO.

Thus, the CPU 1 compares the reflected light quantity Pn incident into a predetermined position of sensor and the Pn+1 on the outer side and judges that no continuity exists if this difference is more than the predetermined quantity ΔP.

However, if the number n is incremented to nE−1, and the differences are always less than a predetermined value (ΔP), then the continuity is determined to exist. In this case, the object extends beyond the edge of the picture as in FIG. 11. Therefore this candidate object is not considered to be a principal object and is therefore removed as a candidate.

In view of the fact that the quantity of reflected light is inversely proportional to the square of distance, the ΔP value may also be changed according to the distance measurement results of the judged points. This is because, when the object is far, a distance difference between the object and the background produces a small amount of difference in the amount of light. On the other hand, when the object is near, even a small distance difference between the object and the background can nonetheless produce to a major difference of the light amount. Therefore, the ΔP value should be large in the continuity judgment at a short distance and small in the continuity judgment at a long distance. In this refined method, such a step of "Change ΔP based on distance" is added to a point A of the sequence of flow chart in FIG. 13.

Thus, the continuity of the distance distribution can be measured by the image pattern judgment (i.e., the light quantity distribution judgment) to make a high-speed judgment in Embodiment 2.

In Embodiment 2, an object extending beyond the edge (or boundary) of the picture is removed from consideration as a focusing target by judging the pattern of reflected light. However, the focusing precedence may be lowered if no object corresponding to a principal object candidate exists. As an example of lowering the focusing precedence, the object distance to be measured may be increased (e.g., multiplied by a number greater than one (e.g., two), so that the object is regarded to be farther than actuality to judge which is the focusing target.

Figure 14:
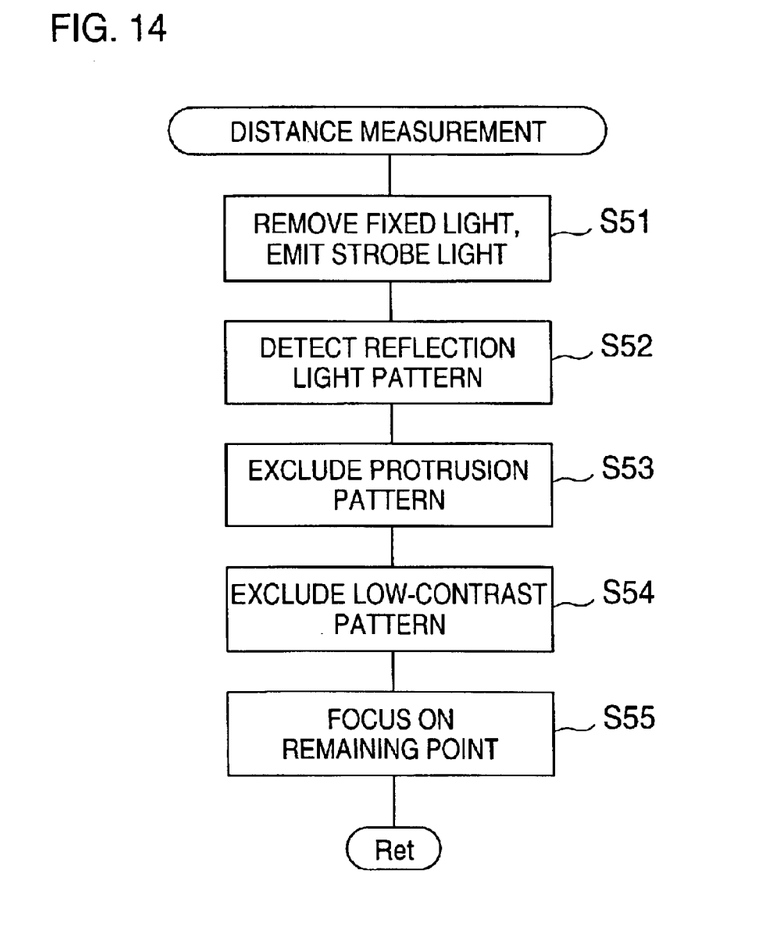
FIG. 14 is a flow chart of an exemplary method of measuring distance, considering contrast, in a manner consistent with Embodiment 2 of the present invention.

FIG. 14 is a flow chart of a distance measurement method that also considers the contrast of objects. Since the contrast of a principal object is usually not low, objects with low contrast are excluded as a candidate principle object to be used as the focusing target in this method. Moreover, the fixed light is removed because the distance measurement of a low-contrast pattern is difficult.

As shown in FIG. 14, the CPU 1 first controls components 8 and 8a to emit a (stroboscopic) light, and controls component 2c for eliminating the fixed light during the distance measurement in step S51. Next, the CPU 1 judges a reflected pattern in step S52 and excludes a protrusion pattern in step S53. This procedure is the same as the corresponding portions of the flow chart of FIG. 13. Subsequently, the CPU 1 extracts a low-contrast portion from an image pickup range in step S54 and excludes this portion as a candidate principle object to be used as the focusing target. Then, the CPU 1 executes the focusing for the remaining distance-measuring point(s).

Of course, the nR and nE in FIG. 11 and FIG. 13 may also be changed depending on the focal distance of photographic lens.

As with the above, this embodiment provides a distance-measuring device in a camera that considers the position of an object in a picture, judges the distance, continuity and contrast of image signal to determine which of a number of candidate objects is a principal object and reduces or eliminates focusing on other objects.

As described above, this invention provides a distance-measuring device of camera which has a high possibility of correctly focusing on a principal object regardless of the position of the principal object in a photographic picture.

While there has been shown and described what is considered to be the preferred embodiments of the invention, it is, of course, understood that various modifications and changes in form or detail could readily be made without departing from the spirit of the invention. It is therefore intended that the invention be not limited to the exact forms described and described, but should be construed to cover all modifications that may fall within the scope of the appended claims.

What is claimed is:

1. A distance-measuring device of a camera comprising:
    a distance-measuring part that has a light-receiving lens for receiving a light from at least one object and a sensor array with a light-receiving plane located on the focal plane of the above light-receiving lens, and detects a distance to each of the at least one object at multiple distance-measuring points in a picture; and
    a processor for calculating a focusing distance, the processor has a continuity judgment function for judging, when one of the at least one object exists at a periphery of the picture, whether the object continues to a boundary of the picture based on distance-measuring results of the above distance-measuring part.

2. The distance-measuring device of the camera according to claim 1, wherein
    the processor does not take the object as a focusing target candidate if the above continuity judgment function judges that the object continues to the boundary of the picture.

3. The distance-measuring device of the camera of according to claim 1, wherein the processor takes the above object as a focusing target candidate if the above continuity judgment function judges that the object does not continue to the boundary of picture.

4. The distance-measuring device of the camera according to claim 1, wherein
    the processor lowers a focusing precedence for the object if the continuity judgment function judges that the object continues to the boundary of picture.

5. The distance-measuring device of the camera according to claim 1, wherein
    the continuity judgment function judges that the object corresponding to a first distance-measuring point locating at the periphery of the picture continues to the boundary of the picture when
    the distance of a first distance measuring point is within a predetermined range with a distance of a nearest measuring point in a group of distance measuring points joined in a direction from the first distance-measuring point to the boundary of the picture.

6. The distance-measuring device of the camera according to claim 5, wherein the distance-measuring part has a common distance-measuring region and an expanded distance-measuring region on a side of the picture boundary to the common distance-measuring region; and the first distance-measuring point is located in the common distance-measuring region and the rest of the distance-measuring points of the group are located in the expanded distance-measuring region.

7. A distance-measuring device of a camera comprising:

image-detecting means that detect an image signal of multiple distance-measuring points in a picture including a picture center;

distance-measuring means that perform distance measurement by using an output of the image-detecting means; and invalidating means that invalidate a part of the distance-measuring points when an object, whose distance is measured using the image signal of a part of the distance-measuring points, crosses the boundary of the picture.

8. A camera comprising:

a distance-measuring unit having lenses and sensors, for measuring a distance to an object at a plurality of points within a picture frame; and a processing unit including a CPU electrically coupled with the distance-measuring unit, and detecting whether an object, whose distance is measured by the distance-measuring unit, crosses the boundary of the picture frame based on a measurement result of the distance-measuring unit.

9. The camera according to claim 8, wherein the processing unit further excludes the object as a focusing target or lowers a focusing precedence of the object if the object crosses the boundary of the picture frame.

10. Apparatus comprising:

a) a distance-measuring device for detecting a distance to each of at least one object at multiple distance-measuring points in a scene;

b) a continuity judgment device for judging, when one of the at least one object exists at a periphery of the scene, whether the object continues to a boundary of the scene using distances at distance-measuring points determined by the distance-measuring device; and c) a principle object selection device for selecting a principle object using a continuity judgment from the continuity judgment device.

11. The apparatus of claim 10 further comprising:

d) focus control means for focusing on the principle object selected by the principle object selection device.

12. The apparatus of claim 10 wherein an object at a periphery of the scene is excluded from consideration as a principle object by the principle object selection device if the continuity judgment device judges that the object continues to a boundary of the scene.

13. A method comprising:

a) detecting a distance to each of at least one object at multiple distance-measuring points in a scene;

b) judging, when one of the at least one object exists at a periphery of the scene, whether the object continues to a boundary of the scene using distances detected; and c) selecting a principle object using a continuity judgment.

14. The method of claim 13 further comprising:

d) focusing on the principle object selected.

15. The method of claim 14 wherein an object at a periphery of the scene is excluded from consideration as a principle object if the continuity judgment determines that the object continues to a boundary of the scene.

* * * * *